(12) United States Patent
Ratliff

(10) Patent No.: US 12,389,877 B1
(45) Date of Patent: Aug. 19, 2025

(54) PET GROOMERS' ACCESSORIES

(71) Applicant: Troy Ratliff, Owensboro, KY (US)

(72) Inventor: Troy Ratliff, Owensboro, KY (US)

(*) Notice: Subject to any disclaimer, the term of this patent is extended or adjusted under 35 U.S.C. 154(b) by 0 days.

(21) Appl. No.: 18/240,154

(22) Filed: Aug. 30, 2023

Related U.S. Application Data

(60) Provisional application No. 63/374,019, filed on Aug. 31, 2022.

(51) Int. Cl.
*A01K 1/04* (2006.01)
*A47G 23/00* (2006.01)
*B25H 3/06* (2006.01)
*F16B 47/00* (2006.01)
*F16M 13/02* (2006.01)
*A47G 23/06* (2006.01)

(52) U.S. Cl.
CPC ............ *A01K 1/04* (2013.01); *A47G 23/00* (2013.01); *B25H 3/06* (2013.01); *F16B 47/006* (2013.01); *F16M 13/022* (2013.01); *A47G 2023/0666* (2013.01)

(58) Field of Classification Search
CPC ........ A01K 1/04; F16B 47/006; F16M 13/022
See application file for complete search history.

(56) References Cited

U.S. PATENT DOCUMENTS

| | | | |
|---|---|---|---|
| 5,660,276 A | | 8/1997 | Winnard |
| 5,725,096 A | | 3/1998 | Winnard |
| 5,829,392 A | * | 11/1998 | Coleman .................. A01K 1/04 119/676 |
| 7,887,109 B2 | * | 2/2011 | Liao ...................... B66C 1/0225 294/187 |
| 7,992,908 B2 | | 8/2011 | Finck |
| 8,234,725 B2 | * | 8/2012 | Roth .................... A47K 17/022 4/577.1 |
| 8,235,337 B2 | | 8/2012 | Ostendarp |
| 8,496,222 B2 | | 7/2013 | Li |
| 9,057,398 B2 | | 6/2015 | Yang |
| 2002/0117119 A1 | * | 8/2002 | Brown .................... A01K 1/04 119/795 |
| 2006/0207521 A1 | * | 9/2006 | Klauck .................. A01K 1/04 119/786 |
| 2007/0257167 A1 | | 11/2007 | Richter |
| 2009/0071416 A1 | * | 3/2009 | Grbic .................. A01K 13/001 119/792 |

(Continued)

FOREIGN PATENT DOCUMENTS

JP    3154007 U  *  9/2009

OTHER PUBLICATIONS

Machine Translation of JP-3154007-U, Wang Y Y, Sep. 24, 2009 (Year: 2009).*

(Continued)

*Primary Examiner* — Kimberly S Berona
*Assistant Examiner* — Katherine June Walter
(74) *Attorney, Agent, or Firm* — Law Office of J. L. Simunic, PLLC; J. L. Simunic

(57) ABSTRACT

The present development comprises devices for use by an animal groomer during the grooming process. The tie-off attachment comprises a base with a suction cup fixedly attached to a bottom face, and a quick release toggle and attachment ring fixedly attached to the top face. The clipper mat comprises a heavy-duty mat fitted with at least one magnet on an upper face of the mat.

5 Claims, 2 Drawing Sheets

(56) References Cited

U.S. PATENT DOCUMENTS

| | | | |
|---|---|---|---|
| 2010/0133863 A1* | 6/2010 | Liao | B66C 1/0212 |
| | | | 294/65 |
| 2013/0092088 A1* | 4/2013 | Sharp | A01K 5/01 |
| | | | 119/61.5 |
| 2013/0276675 A1 | 10/2013 | Guerrero | |
| 2016/0032960 A1 | 2/2016 | Feldman et al. | |

OTHER PUBLICATIONS

Amazon.com: YYST Suction Cup Hook Cleat for Pet Dog & cat Bathtub, Shower & Bathing, Grooming Tether—No Leash, accessed Nov. 15, 2024, product first available Sep. 1, 2018, https://www.amazon.com/YYST-Suction-Bathtub-Bathing-Grooming/dp/B07H1GNGLJ/ref=sr_1_2?crid=39OE7I1I7LU3Y&dib=eyJ2IjoiM (Year: 2021).*

Amazon.com: Dog Bathing Tether with Heavy Suction Cup, Dog Grooming Tub Restraint Soft Nylon Leash with Adjustable Collar for Pet Dog Cat Shower and Grooming Red, accessed Nov. 15, 2024, product first available Nov. 24, 2020, https://www.amazon.com/dp/B08P38YDGZ/ref=sspa_dk_detail_4?psc=1&pd_r (Year: 2020).*

Amazon.com: Agape Heavy Duty Dog Bathing Suction Cup with Adjustable Collar Restraint Leash, Powerful Reusable Pet Grooming Tub Loop, Portable Dog Bath Holder, accessed Nov. 15, 2024, product first available Aug. 14, 2024, https://www.amazon.com/Agape-Adjustable-Restraint-Powerful-Reusable/dp/B0 (Year: 2024).*

* cited by examiner

PET GROOMERS' ACCESSORIES

CROSS-REFERENCE TO PRIOR APPLICATIONS

The present application claims priority to U.S. 63/374,019 filed 31 Aug. 2022.

FEDERALLY SPONSORED RESEARCH AND DEVELOPMENT

Not applicable.

JOINT RESEARCH AGREEMENT

Not applicable.

REFERENCE TO A "SEQUENCE LISTING", A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

Not applicable.

STATEMENT REGARDING PRIOR DISCLOSURES BY AN INVENTOR OR JOINT INVENTOR

The subject matter of the instant invention was described in website https://alphagroomingproducts.com/products/alpha-axt on 31 Aug. 2021 and first made available for sale on 31 Aug. 2021.

BACKGROUND OF THE INVENTION

(1) Field of the Invention

The invention relates to a tie-off attachment for use by pet groomers.

(2) Description of Related Art Including Information Disclosed Under 37 CFR 1.97 and 37 CFR 1.98

During the pet grooming process, the animal being groomed is normally fitted with a grooming loop. The grooming loop includes a loop at one end that fits around the animal's neck and a latch at the opposing end. During the grooming process, the latch is attached in some manner to a grooming table to limit the movement of the animal.

Not all grooming tables have attachments for the latch at a convenient position. This can create problems for the groomer because the animal cannot be secured at an optimum position. In addition, pet grooming services become more personalized—for example, grooming services may be provided at the animal's residence. In this situation, the groomer may not have a grooming table available, and thus, may not have any means to attachment of the grooming loop latch.

Further, the grooming process requires easy access to a variety of tools, such as clippers and shavers. Laying these tools on the grooming table such that they are in easy reach of the groomer also normally means that they are within the range of the animal being groomed. If the animal becomes antsy or moves around during the grooming process, the tools can easily be knocked off the grooming table or pushed out of reach of the groomer.

Thus, it would be beneficial if an attachment to secure the grooming loop that could easily attach to any flat surface and at any location on the flat surface was available. In addition, it would be beneficial if some means to retain the grooming tools within a reasonable distance of the groomer was available.

SUMMARY OF THE PRESENT INVENTION

The present development comprises devices for use by an animal groomer during the grooming process. The tie-off attachment comprises a base with a suction cup fixedly attached to a bottom face, and a quick release toggle and attachment ring fixedly attached to the top face. The clipper mat comprises a heavy-duty mat fitted with at least one magnet on an upper face of the mat.

DETAILED DESCRIPTION OF THE PRESENT DEVELOPMENT

The present development comprises devices for use by an animal groomer during the grooming process, such as when grooming a domestic dog. The devices may be used together or separately.

The first device is a tie-off attachment. Most animal grooming tubs have one or two tie-offs that will work for one size of animal, but can be difficult to use when larger or smaller animals are being groomed. This requires the groomer to constantly change out grooming loops, add extensions, or drill in a new tie-off point. The tie-off attachment of the present development allows a groomer to place a tie-off point for their grooming loops on nearly any flat surface. It further provides the flexibility to move the pet around as needed without having to worry about the placement of the tie-off.

Figure 1:
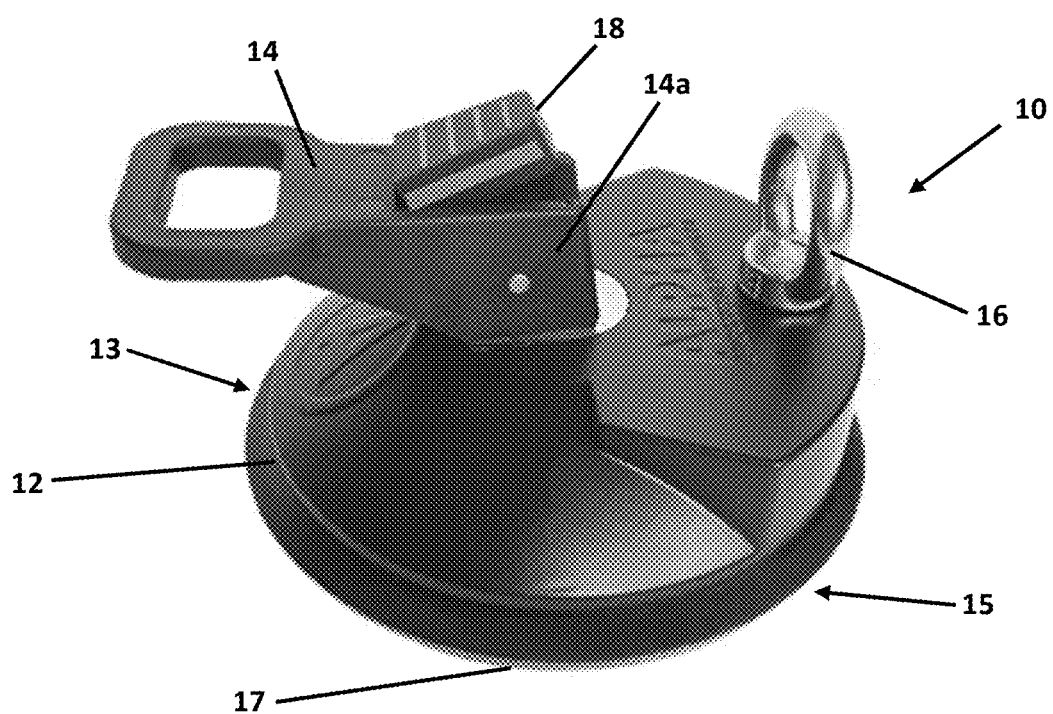
FIG. 1 is a perspective view of the tie-off development of the present invention.
Figure 2:
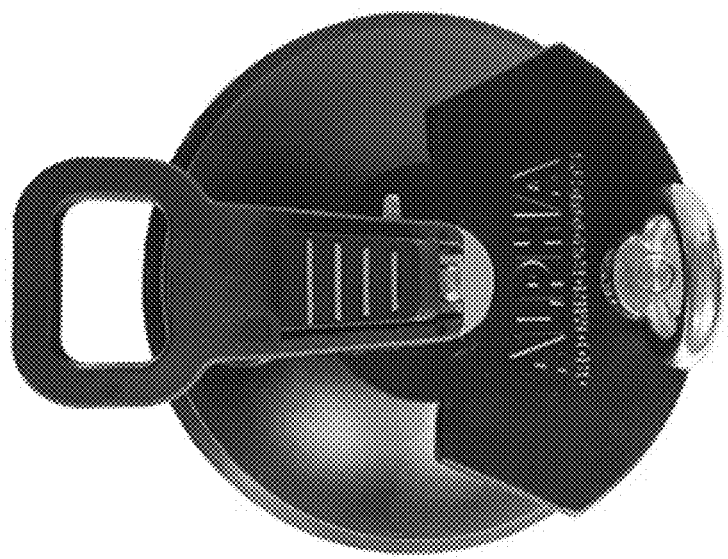
FIG. 2 is a top view of the tie-off development of FIG. 1.
Figure 3:
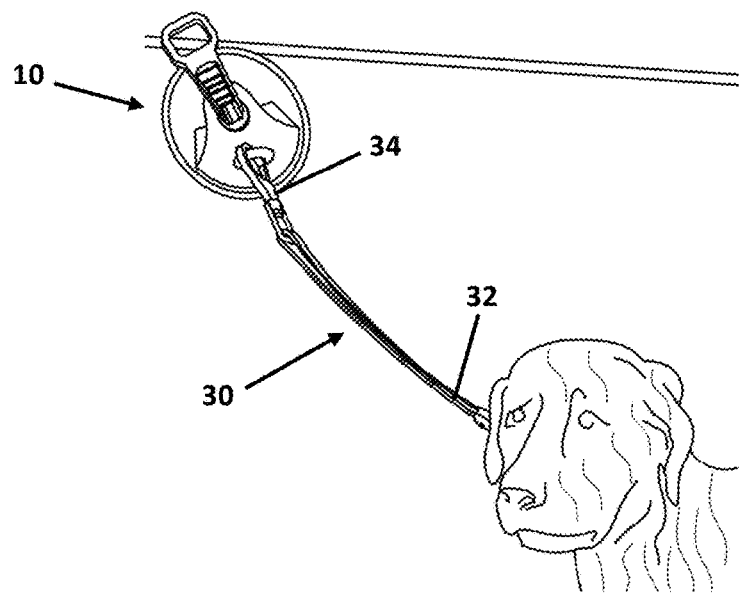
FIG. 3 is a perspective view of the tie-off development of FIG. 1 shown with a grooming loop attached; and, FIG. 4(*a*) is a top view of a first embodiment of the clipper mat, and FIG. 4(*b*) is a top view of a second embodiment of the clipper mat.

An exemplary tie-off attachment is shown in FIGS. 1-3. The tie-off attachment 10 comprises a base 12 having a top face 13 and a bottom face 15. A suction cup 17 is fixedly attached to the bottom face 15. The suction cup 17 allows the tie-off attachment to adhere to almost any relatively flat surface. A quick release toggle 14, that defines a pivot section 14*a*, and an attachment ring 16 are fixedly attached to the top face 13. The ring 16 allows for a grooming loop to easily attach to the tie-off attachment 10. The quick release toggle 14 has a sealed position and an unsealed position. When the tie-off attachment 10 is adhered to the surface, the toggle 14 is in the sealed position; to release the tie-off attachment 10 from the surface, the toggle 14 is moved to the unsealed position. When the toggle 14 is moved to the unsealed position it causes the suction cup 17 to release from the surface so the tie-off attachment can be easily removed or moved to a new location. In a preferred embodiment, the toggle 14 has an ergonomic design. In a preferred embodiment, the tie-off attachment includes a suction loss indicator 18.

In a preferred embodiment, the tie-off attachment 10 is made from cast aluminum with stainless steel fittings and a hardened plastic handle. Although this material combination is not required, it is recommended that the materials selected allow the tie-off attachment to withstand the wet, harsh, humid environments of a grooming salon.

An optimum size for the tie-off attachment is about 4.5" in diameter. This makes the tie-off attachment 10 small enough to allow for easy one-handed manipulation but large enough to accommodate the toggle 14 and ring 16.

During the pet grooming process, the animal being groomed is normally fitted with a grooming loop 30. The grooming loop 30 includes a loop 32 at one end that fits around the animal's neck and a latch 34 at the opposing end. The tie-off attachment 10 allows the animal groomer to attach the latch to limit the movement of the animal. The tie-off attachment 10 may be attached to a grooming table, if available, or to any essentially flat surface, such as a wall in a mobile grooming vehicle. To use the tie-off attachment 10, the groomer selects a desired tie-off point. The tie-off attachment 10 is then attached to the surface by pressing the suction cup 17 against the surface until the suction cup 17 adheres to the surface and the suction loss indicator 18 shows no suction loss. The grooming loop latch is then reversibly attached to the tie-off attachment ring 16. During the grooming process, the groomer can change the location of the tie-off attachment 10 without releasing the grooming loop latch from the tie-off attachment 10 by using the quick release toggle 14. The groomer presses on the suction loss indicator 18 while simultaneously moving the quick release toggle 14 from a sealed position to an unsealed position. When the toggle 14 is moved to the unsealed position it causes the suction cup 17 to release from the surface so the tie-off attachment can be easily removed or moved to a new location. The tie-off attachment 10 is then attached to the surface at the new location by pressing the suction cup 17 against the surface until the suction cup 17 adheres to the surface and the quick release toggle 14 is in the sealed position and the suction loss indicator 18 shows no suction loss. Because of the design of the tie-off attachment 10, the tie-off attachment 10 may be moved by the groomer using one hand so the groomer's second hand may support the animal being groomed. When the grooming process is complete, the groomer releases the grooming loop latch from the attachment ring 16 and can transport the groomed animal away from the grooming table.

Figure 4A:
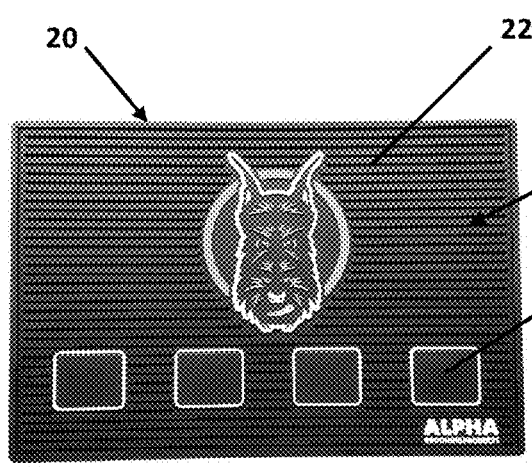
Figure 4B:
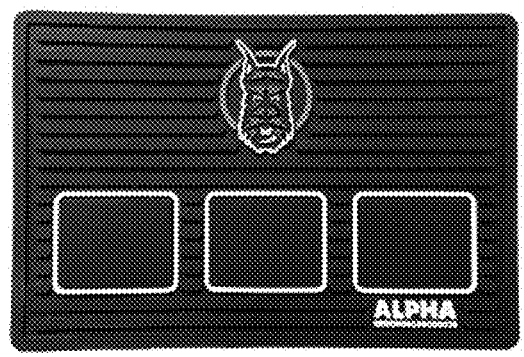

The second device is a clipper mat 20, as shown in FIGS. 4(a) and 4(b). The clipper mat 20 comprises a heavy-duty pad 22 fitted with at least one magnet 24 on an upper face 23 of the mat. During the grooming process, the groomer normally uses a variety of metal-inclusive objects, such as electric clippers and scissors. The magnetic inserts 24 allow the groomer to place the grooming objects in a secure and easily accessible location.

The size of the clipper mat 20 may vary to accommodate the desired number of magnets. For example, as shown in FIG. 4(a), a 12"×18" pad 22 can easily accommodate four magnets 24. Alternatively, as shown in FIG. 4(b), a smaller pad 22, such as a 6"×9" pad, may be used with fewer magnets. However, both the larger and the smaller mats 20 function to hold the metal-inclusive objects. In a preferred embodiment, the heavy-duty pad 22 has an anti-skid surface on a bottom face (not shown). Optionally, two-sided tape can be added to the bottom face for extra security, such as when used in mobile units.

Unless defined otherwise, all technical and scientific terms used herein have the same meaning as commonly understood by one of ordinary skill in the art to which the presently disclosed subject matter pertains. All patents, patent applications, published applications and publications, databases, websites and other published materials referred to throughout the entire disclosure herein, unless noted otherwise, are incorporated by reference in their entirety. Representative methods, devices, and materials are described herein, but are not intended to be limiting unless so noted.

The terms "a", "an", and "the" refer to "one or more" when used in the subject specification, including the claims. The term "reversibly attached" as used herein means that at least a first element and a second element can be connected together and then separated from each other without affecting the integrity of either element. The term "ambient temperature" as used herein refers to an environmental temperature of from about 0° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A method of securing an animal during grooming comprising:

fitting the animal with a grooming loop having a loop at one end and a latch at the opposing end, wherein the latch is reversibly attached to a tie-off attachment, wherein the tie-off attachment is reversibly attached to a surface by a suction cup affixed to a bottom face of the tie-off attachment, wherein the tie-off attachment has a quick release toggle and a suction loss indicator that can be depressed by a groomer, wherein the tie-off attachment further has a tie-off attachment ring affixed to the tie-off attachment, and wherein the grooming loop latch is reversibly attached to the tie-off attachment ring; and changing the position of the tie-off attachment by keeping the grooming loop latch attached to the tie-off attachment ring while pressing on the suction loss indicator and simultaneously moving the quick release toggle from a sealed position to an unsealed position to release the suction cup from the surface, and then selecting a new location and pressing the suction cup against the surface at the new location until the suction cup adheres to the surface and the quick release toggle is in the sealed position and the suction loss indicator shows no suction loss.

2. The method of claim 1 wherein the groomer releases the grooming loop latch from the attachment ring when the grooming process is complete.

3. An animal groomer's tie-off attachment comprising:
  (a) a base having a top face and a bottom face;
  (b) a suction cup fixedly attached to the bottom face, wherein the suction cup will adhere to a surface;
  (c) an attachment ring fixedly attached to the base;
  (d) a quick release toggle fixedly attached to the top face, wherein the quick release toggle has a sealed position wherein the suction cup is adhered to the surface and an unsealed position wherein the suction cup releases from the surface, and wherein the quick release toggle can be moved from the sealed position to the unsealed position; and,
  (e) a suction loss indicator,
  wherein the suction cup is configured to be released from the surface by pressing the suction loss indicator while simultaneously moving the quick release toggle from the sealed position to the unsealed position.

4. The tie-off attachment of claim 3 wherein the tie-off attachment is made from materials selected to allow the tie-off attachment to withstand wet, harsh, humid environments of a grooming salon.

5. The tie-off attachment of claim 4 wherein the tie-off attachment is made from cast aluminum, stainless steel, and plastic.

* * * * *